US010632423B2

(12) United States Patent
Caudle (10) Patent No.: US 10,632,423 B2
(45) Date of Patent: Apr. 28, 2020

(54) BIMETALLIC CATALYSTS FOR SELECTIVE AMMONIA OXIDATION (75) Inventor: Matthew Tyler Caudle, Hamilton, NJ (US)

(73) Assignee: BASF Corporation, Florham Park, NJ (US)

(*) Notice: Subject to any disclaimer, the term of this patent is extended or adjusted under 35 U.S.C. 154(b) by 567 days.

(21) Appl. No.: 12/263,864

(22) Filed: Nov. 3, 2008

(65) Prior Publication Data
US 2010/0111791 A1 May 6, 2010

(51) Int. Cl.
| | |
|---|---|
| B01D 53/94 | (2006.01) |
| B01J 29/068 | (2006.01) |
| B01J 29/072 | (2006.01) |
| B01J 29/14 | (2006.01) |
| B01J 29/76 | (2006.01) |
| B01J 35/02 | (2006.01) |
| B01J 37/00 | (2006.01) |
| B01J 37/02 | (2006.01) |

(52) U.S. Cl.
CPC ........ *B01D 53/9436* (2013.01); *B01J 29/068* (2013.01); *B01J 29/072* (2013.01); *B01J 29/146* (2013.01); *B01J 29/763* (2013.01); *B01J 29/7615* (2013.01); *B01J 35/023* (2013.01); *B01J 37/0036* (2013.01); *B01J 37/0246* (2013.01); *B01D 2255/1021* (2013.01); *B01D 2255/20761* (2013.01); *B01D 2255/50* (2013.01); *B01D 2257/406* (2013.01); *B01D 2258/012* (2013.01)

(58) Field of Classification Search
None
See application file for complete search history.

(56) References Cited

U.S. PATENT DOCUMENTS

| 5,024,981 A * | 6/1991 | Speronello et al. ............ 502/67 |
| 5,330,945 A * | 7/1994 | Beckmeyer et al. ........... 502/66 |
| 6,133,185 A * | 10/2000 | Kinugasa et al. .............. 502/67 |
| 6,136,291 A * | 10/2000 | Chester .................... B01J 29/08 |
| | | 423/713 |
| 6,914,026 B2 * | 7/2005 | Tran et al. ...................... 502/66 |

(Continued)

FOREIGN PATENT DOCUMENTS

| CN | 101 007 283 | 8/2007 |
| CN | 101 259 377 | 9/2008 |

(Continued)

OTHER PUBLICATIONS

Long et al("Selective Catalytic Oxidation (SCO) of Ammonia to Nitrogen over Fe-Exchanged Zeolites", J of Cata, 201, (2001) 145-152).*

(Continued)

*Primary Examiner* — Melvin C. Mayes
*Assistant Examiner* — Michael Forrest
(74) *Attorney, Agent, or Firm* — Womble Bond Dickinson (US) LLP (57) ABSTRACT Catalysts, methods, and systems for treating diesel engine exhaust streams are described. In one or more embodiments, the catalyst comprises a molecular sieve having a silica to alumina ratio (SAR) less than about 30, the molecular sieve including ion-exchanged copper and ion-exchanged platinum. Systems including such catalysts and methods of treating exhaust gas are also provided.

22 Claims, 4 Drawing Sheets

(56) References Cited

U.S. PATENT DOCUMENTS

| | | | |
|---|---|---|---|
| 2003/0175562 A1 | 9/2003 | Taguchi et al. | |
| 2004/0037757 A1 | 2/2004 | Taguchi et al. | |
| 2004/0043891 A1* | 3/2004 | Cho et al. | 502/64 |
| 2005/0054524 A1 | 3/2005 | Tran et al. | |
| 2007/0286786 A1 | 12/2007 | Ikoma et al. | |
| 2008/0112870 A1 | 5/2008 | Moini et al. | |
| 2009/0060809 A1* | 3/2009 | Shioya et al. | 423/237 |

FOREIGN PATENT DOCUMENTS

| | | | |
|---|---|---|---|
| EP | 0773057 | 5/1997 | |
| EP | 0803279 | 10/1997 | |
| JP | 05-049934 | 3/1993 | |
| JP | H09-155199 | 6/1997 | |
| JP | 2002/226204 | 8/2002 | |
| WO | WO-2002/092196 | 11/2002 | |
| WO | WO-2006103754 | 10/2006 | |
| WO | 20070004774 A1 | 1/2007 | |
| WO | WO-2007/004774 | 1/2007 | |
| WO | WO2007/004774 A1 | 1/2007 | |
| WO | WO 2007004774 A1 * | 1/2007 | B01D 53/9436 |
| WO | 20080106523 A2 | 9/2008 | |
| WO | WO 2008/106518 | 9/2008 | |
| WO | WO 2008/106519 | 9/2008 | |

OTHER PUBLICATIONS

Long et al(Noble metal (Pt, Rh, Pd) promoted Fe-ZSM-5 for selective catalytic oxidation of ammonia to N2 at low temperatures, Cata Lett, vol. 78, Nos. 1-4, (2002) 353-357).*

Long et al("Superior ion-exchanged ZSM-5 catalysts for selective catalytic oxidation of ammonia to nitrogen" Chem Comm, (2000) 1651-1652).*

Curtin, T. et al., "Copper exchanged beta zeolites for the catalytic oxidation of ammonia", *S. Chem. Commun.* 2003, 1280-1281.

De Croon, M.H.J.M. et al., "Development of the kinetic model of platinum catalyzed ammonia oxidation in a microreactor", *Chemical Engineering Journal* 90 2002, 61-76.

De Graaf, J. et al., "Preparation of Highly Dispersed Pt Particles in Zeolite Y with a Narrow Particle Size Distribution: Characterization by Hydrogen Chemisorption, TEM, EXAFS Spectroscopy, and Particle Modeling", *Journal of Catalysis*, 203 2001, 307-321.

Gang, L. et al., "NH3 oxidation to nitrogen and water at low temperatures using supported transition metal catalysts", *Catalysis Today*, 61 2000, 179-185.

Gland, J. L. et al., "Ammonia oxidation on a stepped platinum single crystal surface", *Journal of Catalysis*, 53 1978, 9-23.

Van Helden, R. et al., "Optimization of urea SCR deNOx systems for HD diesel engines", *Society of Automotive Engineers, SP-1861 (Diesel Exhaust Emission Control Modeling)* 2004, 25-37.

Johnson, T. V. , "Diesel emission in control review", *Society of Automotive Engineers, SP-2022 (Diesel Exhaust)* 2006, 1-16.

Katare, S. R. et al., "Diesel Aftertreatment Modeling: A Systems Approach to NOx Control", *Ind. Eng. Chem. Res.*, 46 2007, 2445-2454.

Li, Y. et al., "Selective NH3 oxidation to N2 in a wet stream", *Applied Catalysis, B:Environmental*, 13 1997, 131-139.

Long, R. Q. et al., "Noble metal (Pt, Rh, Pd) promoted Fe-ZSM-5 for selective catalytic oxidation of ammonia to N2 at low temperatures", *Catalysis Letters*, 78 2002, 353-357.

Nutt, C. et al., "Oxidation of ammonia on platinum", *Nature*, 224 1969, 169.

Olofsson, G. et al., "Selective catalytic oxidation of ammonia to nitrogen at low temperature on Pt/CuO/Al2O3", *Journal of Catalysis*, 230 2005, 1-13.

Perez-Ramirez, J. et al., "Mechanism of ammonia oxidation over oxides studied by temporal analysis of products", *Journal of Catalysis*, 250 2007, 240-246.

Perez-Ramirez, J. et al., "Selectivity-directing factors of ammonia oxidation over PGM gauzes in the Temporal Analysis of Products reactor: Secondary interactions of NH3 and NO", *Journal of Catalysis*, 229 2005, 303-313.

Stakheev, A. Y. et al., "Evidence for Monatomic Platinum Species in H-ZSM-5 from FTIR Spectroscopy of Chemisorbed CO", *Journal of Catalysis*, 169 1997, 382-388.

Van Den Broek, A.C.M. et al., "Water-promoted ammonia oxidation by a platinum amine complex in zeolite HZSM-5 catalyst", *Catalysis Letters*, 55 1998, 79-82.

Supplementary EP Search Report in EP 09 82 9668, dated Jul. 5, 2012, 5 pgs.

Moretti, Giuliano et al., "Characterization and Catalysis of Pt-Cu Clusters in NaY", *Journal of Catalysis* 15 1989, 205-216.

English Machine Translation of JP-H09-155199, 7 pages.

Ahn, D.H., et al., "Characterization of zeolite-supported Pt-Cu bimetallic catalyst by xenon-129 NMR and EXAFS," Journal of Catalysis, 1992, vol. 133, pp. 191-201.

* cited by examiner

BIMETALLIC CATALYSTS FOR SELECTIVE AMMONIA OXIDATION

TECHNICAL FIELD

Exhaust emissions treatment catalysts, systems and methods for internal combustion engines and methods for their manufacture and use with lean burn engines, including diesel engines and lean burn gasoline engines, are disclosed.

BACKGROUND

Diesel engine exhaust is a heterogeneous mixture that contains particulate emissions such as soot and gaseous emissions such as carbon monoxide, unburned or partially burned hydrocarbons, and nitrogen oxides (collectively referred to as $NO_x$). Catalyst compositions, often disposed on one or more monolithic substrates, are placed in engine exhaust systems to convert certain or all of these exhaust components to innocuous compounds.

Ammonia selective catalytic reduction (SCR) is a $NO_x$ abatement technology that will be used to meet strict $NO_x$ emission targets in diesel and lean-burn engines. In the ammonia SCR process, $NO_x$ (consisting of $NO+NO_2$) is reacted with ammonia (or an ammonia precursor such as urea) to form dinitrogen ($N_2$) over a catalyst typically composed of base metals. This technology is capable of $NO_x$ conversions greater than 90% over a typical diesel driving cycle, and thus it represents one of the best approaches for achieving aggressive $NO_x$ abatement goals.

A characteristic feature of some ammonia SCR catalyst materials is a propensity to retain considerable amounts of ammonia on Lewis and Brønsted acidic sites on the catalyst surface during low temperature portions of a typical driving cycle. A subsequent increase in exhaust temperature can cause ammonia to desorb from the ammonia SCR catalyst surface and exit the exhaust pipe of the vehicle. Overdosing ammonia in order to increase $NO_x$ conversion rate is another potential scenario where unreacted ammonia may exit from the ammonia SCR catalyst.

Ammonia slip from the ammonia SCR catalyst presents a number of problems. The odor threshold for $NH_3$ is 20 ppm in air. Eye and throat irritation are noticeable above 100 ppm, skin irritation occurs above 400 ppm, and the IDLH is 500 ppm in air. $NH_3$ is caustic, especially in its aqueous form. Condensation of $NH_3$ and water in cooler regions of the exhaust line downstream of the exhaust catalysts will give a corrosive mixture.

Therefore, it is desirable to eliminate or substantially reduce the ammonia before it can pass into the tailpipe. A selective ammonia oxidation (AMOx) catalyst is employed for this purpose, with the objective to convert the excess ammonia to $N_2$. The ideal catalyst for selective ammonia oxidation will be able to convert ammonia at all temperatures where ammonia slip occurs in the vehicles driving cycle, and will produce minimal nitrogen oxide byproducts. This latter requirement is particularly critical since any production of NO or $NO_2$ by the AMOx catalyst decreases the effective $NO_x$ conversion of the exhaust treatment system. The AMOx catalyst should also produce minimal $N_2O$, which is a potent greenhouse gas.

Catalysts comprised of Pt supported on a metal oxide such as γ-alumina are the most active $NH_3$ oxidation catalysts known, exhibiting $NH_3$ lightoff temperatures below 250° C. They are highly effective for the removal of $NH_3$ from a gas stream under oxidizing conditions. However, the selectivity to $N_2$ is not high enough to be applicable in a vehicle emission system. At 250° C., $N_2$ selectivity is less than 50%, with the primary co-product of $NH_3$ oxidation being $N_2O$. As the temperature increases, $N_2$ selectivity decreases. At 450° C., a supported Pt catalyst gives $N_2$ selectivity less than 20%, with the majority of the products consisting of NO and $NO_2$. Hence, there is a desire for ammonia oxidation catalysts with activity comparable to the supported Pt catalysts but with $N_2$ selectivity greater than 60% across the temperature range from 250° C. to 450° C., which is the relevant temperature range for a diesel vehicle driving cycle.

SUMMARY

Aspects of the invention pertain to catalysts, methods, and systems for treating exhaust gas.

A first embodiment of a catalyst for oxidizing ammonia to nitrogen and NOx, the catalyst comprises an aluminosilicate molecular sieve having a silica-to-alumina ratio (SAR) less than about 30, the molecular sieve comprising ion-exchanged copper and ion-exchanged platinum. In specific embodiments, the SAR may be less than about 10 or 6. In one or more embodiments, the catalyst further comprises an amount of zerovalent or metallic platinum.

In one or more embodiments, the platinum is added to the catalyst by a cation-exchange process of a platinum complex precursor. Exemplary platinum precursors can be selected from the group comprising a tetraammineplatinum (II) salt, a tetraammineplatinum (IV) salt, a tetrachloroplatinum (II) salt, a hexachloroplatinum (IV) salt, platinum hydroxides, platinum hydrates, platinum bis(acetylacetonates), and combinations thereof.

The aluminosilicate molecular sieve may comprise a zeolite having a crystal framework types selected from FAU, MFI, MOR, BEA, HEU, and OFF.

In one or more embodiments, the catalyst is capable of catalyzing substantially complete conversion of ammonia at about 250° C. In an embodiment, the catalyst is capable of providing greater than about 60% selectivity for oxidizing the ammonia to dinitrogen at about 250° C. According to one or more embodiments, the catalyst is capable of providing greater than about 60% selectivity for oxidizing the ammonia to dinitrogen at about 400° C.

Another aspect of the invention pertains to a method for treating emissions produced in the exhaust gas stream of a diesel or lean-burn vehicle, the method comprising passing a vehicle's engine exhaust stream through at least a $NO_x$ abatement catalyst; and passing the exhaust stream exiting the $NO_x$ abatement catalyst and containing ammonia through an oxidation catalyst, the oxidation catalyst comprising molecular sieve having ion-exchanged platinum and ion-exchanged copper, the molecular sieve having silica to alumina ratio (SAR) less than about 15. According to one or more embodiments, the $NO_x$ abatement catalyst is selected from one or more of an SCR catalyst, a lean $NO_x$ trap catalyst, or other catalyst for the destruction of $NO_x$ that results in slippage of ammonia from the $NO_x$ abatement catalyst.

In a specific embodiment, the $NO_x$ abatement catalyst and oxidation catalyst composition are disposed on separate substrates. Alternatively, in other embodiments, the $NO_x$ abatement catalyst and the oxidation catalyst are disposed on the same substrate.

Another aspect of the invention pertains to a system for treating an exhaust gas stream comprising an SCR catalyst in communication with the exhaust gas stream; an ammonia or ammonia precursor injection port in communication with the exhaust gas stream and located upstream from the SCR catalyst; and a catalyst for oxidizing ammonia to nitrogen and NOx as described herein in communication with the exhaust gas stream and located downstream from the SCR catalyst.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "abate" means to decrease in amount and "abatement" means a decrease in the amount, caused by any means. Where they appear herein, the terms "exhaust stream" and "engine exhaust stream" refer to the engine out effluent as well as to the effluent downstream of one or more other catalyst system components including but not limited to a diesel oxidation catalyst and/or soot filter.

As used herein, "ion-exchanged" or "metal-exchanged" (e.g. "copper-exchanged") means that a metal is supported on or in a molecular sieve material. At least some of the metal is in ionic form, and in one or more embodiments, a portion of the metal may be in the zerovalent or metallic form or may be in the form of metal oxide aggregates. As referred to herein, weight percent of a metal in catalyst refers to the ratio of the weight of a particular metal, for example copper or platinum, to the weight of a washcoat layer in which that metal is supported.

Aspects of the invention pertain to catalysts, methods, and systems for treating exhaust gas. In one embodiment a catalyst for oxidizing ammonia to nitrogen and $NO_x$, the catalyst comprises an aluminosilicate molecular sieve having a silica-to-alumina ratio (SAR) less than about 30, for example less than about 10, and more particularly, less than about 6. In some embodiments, a catalyst having less than about 1% Pt by weight and less than about 5% copper by weight supported on a molecular sieve by ion-exchange provides substantially complete conversion of ammonia at temperatures less than about 250° C. In one or more embodiments, the catalysts have a selectivity greater than about 60% for oxidizing the ammonia to nitrogen at about 250° C. and at about 400° C.

According to one or more embodiments, the catalyst may be disposed on a monolithic substrate as a washcoat layer. As used herein and as described in Heck, Ronald and Robert Farrauto, *Catalytic Air Pollution Control*, New York: Wiley-Interscience, 2002, pp. 18-19, a washcoat layer comprises a compositionally distinct layer of material disposed on the surface of the monolithic substrate or another washcoat layer. A catalyst can contain one or more washcoat layers, and each washcoat layer can have unique catalytic functions. In one or more embodiments, the total loading of the molecular sieve on the substrate is in the range of about 0.3 g/in³ and about 3.0 g/in³, based on total catalyst volume.

The substrate used in one or more embodiments may include a flow-through honeycomb substrate that comprises a plurality of fine, substantially parallel gas flow passages extending along the longitudinal axis of the substrate. In other embodiments the substrate comprises a wall flow substrate, and the catalyst may be disposed within the porous walls of the wall-flow filter substrate.

Further aspects of the invention are directed to methods and systems for treating emissions produced in the exhaust gas stream of a diesel or lean-burn vehicle. In one embodiment, the method comprises passing a vehicle's engine exhaust stream through at least a $NO_x$ abatement catalyst, which may include an SCR catalyst or other $NO_x$ abatement device; passing the exhaust stream exiting the $NO_x$ abatement catalyst, and possibly containing ammonia, through a selective ammonia oxidation catalyst. In one embodiment, the selective ammonia oxidation catalyst has about 0.2% ion-exchanged Pt by weight and about 3.0% ion-exchanged copper by weight supported on a molecular sieve. In one or more system embodiments, the $NO_x$ abatement catalyst and selective ammonia oxidation catalyst composition are disposed on separate substrates. In alternative system embodiments, the $NO_x$ abatement catalyst and the selective ammonia oxidation catalyst are disposed on the same substrate.

According to one or more embodiments, ammonia oxidation catalysts are provided. The net ammonia oxidation process to $N_2$ occurs in two chemically distinct steps. In the first step, $NH_3$ is converted to NO by reaction with $O_2$, as shown by the stoichiometric Eq 1.

$$4NH_3 + 5O_2 \rightarrow 4NO + 6H_2O \qquad \text{Eq 1}$$

There is general agreement in the field that NO is the primary product of ammonia oxidation over a supported precious group metal (PGM) catalyst. Dinitrogen is produced in a secondary process that combines unreacted $NH_3$ with NO or $NO_2$ (collectively referred to as $NO_x$) according to the stoichiometric Eq 2.

$$4NO_x + 4NH_3 + (3-2x)O_2 \rightarrow 4N_2 + 6H_2O \qquad \text{Eq 2}$$

Two other secondary processes are important in determining the selectivity of an ammonia oxidation catalyst. Nitrous oxide ($N_2O$) can be produced from NO according to Eq 3, and $NO_2$ can be produced according to Eq 4.

$$2NO_x + \rightarrow N_2O + (2x-1)/2 O_2 \qquad \text{Eq 3}$$

$$NO + \tfrac{1}{2}O_2 \rightarrow NO_2 \qquad \text{Eq 4}$$

Equations 1-4 are all usually catalyzed by supported Pt catalysts, and the relative rates of these processes at different temperatures dictates the distribution of oxidation products. Equation 2 is equivalent to the SCR process, and will be catalyzed by any of a number of known SCR catalysts, including copper-containing molecular sieves. Inclusion of a component for catalyzing Eq 2 will generally have the effect to increase the net $N_2$ selectivity of the catalyst. In some embodiments of the invention, an additional component for catalyzing Eq 2 will be included in the catalyst washcoat. In particular embodiments, the component for catalyzing Eq 2 will be a copper-exchanged molecular sieve. In still more specific embodiments, the PGM will be supported directly on or in the copper-exchanged molecular sieve.

The Substrate

According to one or more embodiments, the substrate for the ammonia oxidation catalyst may be any of those materials typically used for preparing automotive catalysts and will typically comprise a metal or ceramic honeycomb structure. Any suitable substrate may be employed, such as a monolithic flow-through substrate having a plurality of fine, parallel gas flow passages extending from an inlet to an outlet face of the substrate, such that passages are open to fluid flow. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels which can be of any suitable cross-sectional shape such as trapezoidal, rectangular, square, sinusoidal, hexagonal, oval, circular, etc. Such structures may contain from about 60 to about 1200 or more gas inlet openings (i.e., "cells") per square inch of cross section (cpsi). A representative commercially-available flow-through substrate is the Corning 400/6 cordierite material, which is constructed from cordierite and has 400 cpsi and wall thickness of 6 mil. However, it will be understood that the invention is not limited to a particular substrate type, material, or geometry.

In alternative embodiments, the substrate may be a wall-flow substrate. Typically, each passage is blocked at one end of the substrate body with a non-porous plug, with alternate passages blocked at opposite end-faces. This requires that gas flow through the porous walls of the wall-flow substrate to pass through the part. Such monolithic substrates may contain up to about 700 or more flow passages per square inch of cross section, although far fewer may be used. For example, the substrate may have from about 7 to 600, more usually from about 100 to 400, cells per square inch. The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches. A representative commercially available wall-flow substrate is the Corning CO substrate, which is constructed from a porous cordierite. However, it will be understood that the invention is not limited to a particular substrate type, material, or geometry.

The ceramic substrate may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

The substrates useful for the bimetallic catalyst composites of embodiments of the present invention may also be metallic in nature and be composed of one or more metals or metal alloys. Exemplary metallic supports include the heat resistant metals and metal alloys such as titanium and stainless steel as well as other alloys in which iron is a substantial or major component. Such alloys may contain one or more of nickel, chromium and/or aluminum, and the total amount of these metals may comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The metallic substrates may be employed in various shapes such as corrugated sheet or monolithic form. A representative commercially-available metal substrate is manufactured by Emitec. However, it will be understood that the invention is not limited to a particular substrate type, material, or geometry. The surface of the metal substrates may be oxidized at high temperatures, e.g., 1000° and higher, to form an oxide layer on the surface of the substrate, improving the corrosion resistance of the alloy and facilitating adhesion of the washcoat layer to the metal surface.

Catalyst Composition and Preparation

While the present invention is not to be limited by any particular theory, one or more embodiments of the catalyst are designed based on the following hypotheses: (1) NO is the initial product of $NH_3$ oxidation according to Eq 1, and the net $NH_3$ conversion is dictated by the rate for this process; (2) NO is the common intermediate leading to all of the other nitrogen product species according to Eqs 2-4, and $N_2$ selectivity is dictated by the relative rates of these secondary reactions involving the NO intermediate; (3) utilization of a PGM support that is itself a good SCR catalyst opens up an additional chemical reaction channel that increases the net rate for Eq 2, thereby favoring formation of $N_2$. These hypotheses together suggest a general paradigm for the design of selective ammonia oxidation catalysts, in which the PGM is supported on or is otherwise directly associated with an SCR component. This approach is distinct from the alternative approaches to the design of bifunctional $NH_3$ oxidation catalysts in which a PGM is placed on a support that is chemically and physically independent of the SCR component. The former approach has several advantages over the latter. It simplifies catalyst manufacture since only a single washcoat layer is required. It is readily amenable to situations where two catalyst layers are not feasible, such as in a wall-flow filter. Finally, it places all of the catalytic functions in close physical proximity (on the same support), which should improve selectivity to the desired $N_2$ product.

One or more embodiments of the invention utilize a molecular sieve, and particularly, a zeolitic molecular sieve support having a low silica-to-alumina ratio (SAR). By decreasing the SAR, the number of ion-exchange sites per gram of zeolite is increased. This decreases the probability that a Cu ion will move from an ion-exchange site to form an aggregate with a platinum active site. The generally accepted paradigm that increasing SAR increases catalytic stability thus teaches away from the process and catalysts of the present invention. A second strategy employed in some embodiments is to fix the copper on the molecular sieve by calcination at high temperature prior to applying the platinum precursor. This also minimizes the probability that a copper ion not associated with an ion exchange site on the molecular sieve (hereafter referred to as free copper) will migrate to a platinum active site.

It is also desired that copper speciation is controlled. Free $Cu^{2+}$ present during the Pt ion-exchange process or during the catalyst coating process leads to catalysts with low activity and/or poor hydrothermal stability. According to one or more embodiments, catalyst stability vis-a-vis $NH_3$ conversion is increased by a high density of $H^-$ sites on the support, which favors dispersion of copper as discrete $Cu^{2+}$ sites rather than as oxide aggregates. This prevents formation of inactive $Pt_xCu_{1-x}O$ ensembles.

Based on the design criteria above, a catalyst according to one or more embodiments of the invention can be prepared by ion-exchange of an aqueous metal precursor on a molecular sieve having a low SAR, followed ion-exchange of an aqueous platinum precursor. In the first step, a metal from one of the groups VB, VIB, VIIB, VIIIB, IB, or IIB of the periodic table can be dissolved in a suitable solvent, e.g. water. Generally, from the point of view of economics and environmental aspects, aqueous solutions of soluble compounds or complexes of the metal are preferred. Exemplary metals include copper (group IB) and iron (group VIIB). For purposes of the present invention, the term "metal precursor" means any compound, complex, or the like which, can be dispersed on the molecular sieve support to give a catalytically-active metal component. For the exemplary Group IB metal copper, suitable complexes or compounds include, but are not limited to anhydrous and hydrated copper sulfate, copper nitrate, copper acetate, copper acetylacetonate, copper oxide, copper hydroxide, and salts of copper ammines (e.g. $[Cu(NH_3)_4]^{2+}$). A representative commercially-available copper source is 97% copper acetate from Strem Chemicals, Inc., which may contain traces of other metals, particularly iron and nickel. However, it will be understood that this invention is not restricted to metal precursors of a particular type, composition, or purity. The desired molecular sieve can then be added to the solution of the metal component to form a suspension. Exemplary molecular sieves include, but are not limited to, zeolites having one of the following crystal structures: CHA, BEA, FAU, MOR, MFI.

This suspension can be allowed to react so that the copper component is distributed on the molecular sieve. In some cases, the suspension may be heated to increase the rate for ion-exchange and to more effectively distribute the copper ions. This may result in the copper ions being preferentially distributed in the pore channels of the molecular sieve, as well as on the outer surface of the molecular sieve. Copper may be distributed as copper (II) ions, copper (I) ions, or as copper oxide. After the copper is distributed on the molecular sieve, the molecular sieve can be separated from the liquid phase of the suspension, washed, and dried. It may also be calcined at high temperature to fix the copper, which increases the $NH_3$ activity of the finished catalyst as noted previously.

In a second preparation step, a platinum precursor in is dissolved in a suitable solvent, e.g. water. Generally, from the point of view of economics and environmental aspects, aqueous solutions of soluble compounds or complexes of the platinum are preferred. Typically, the platinum precursor is utilized in the form of a compound or complex to achieve dispersion of the precursor on the support. For purposes of the present invention, the term "platinum precursor" means any compound, complex, or the like which, upon calcination or initial phase of use thereof, decomposes or otherwise converts to a catalytically active form. Platinum complexes or compounds include, but are not limited to platinum chlorides (e.g. salts of $[PtCl_4]^{2-}$, $[PtCl_6]^{2-}$), platinum hydroxides (e.g. salts of $[Pt(OH)_6]^{2-}$), platinum ammines (e.g. salts of $[Pt(NH_3)_4]^{2+}$, $[Pt(NH_3)_4]^{4+}$), platinum hydrates (e.g. salts of $[Pt(OH_2)_4]^{2+}$), platinum bis(acetylacetonates), and mixed compounds or complexes (e.g. $[Pt(NH_3)_2(Cl)_2]$).

Cationic platinum complexes are preferred in order to effectively exchange with the mobile cations associated with the molecular sieve. A representative commercially-available cationic platinum source is 99% ammonium hexachloroplatinate from Strem Chemicals, Inc., which may contain traces of other precious metals. However, it will be understood that this invention is not restricted to platinum precursors of a particular type, composition, or purity. The molecular sieve may be suspended in a suitable vehicle (e.g. water) and reacted with the platinum precursor in solution. Exemplary molecular sieves, include, but are not limited to, zeolites having one of the following crystal structures: CHA, BEA, FAU, MOR, MFI. Additional processing steps may include fixation by an acidic component (e.g. acetic acid) or a basic component (e.g. ammonium hydroxide), chemical reduction (e.g. by hydrogen), or calcination. The two steps together give a molecular sieve that contains copper and platinum, which should be physically separated on the molecular sieve according to the design paradigms outlined previously.

The Washcoat Layer

According to one or more embodiments, the catalyst is applied as a washcoat layer which is deposited upon, i.e., coated upon and adhered to, the substrate. To apply the catalyst layer to the substrate, finely divided particles of the catalyst, comprising the platinum component and/or the metal zeolite component, are suspended in an appropriate vehicle, e.g., water, to form a slurry. Other promoters and/or stabilizers and/or surfactants may be added to the slurry as mixtures or solutions in water or a water-miscible vehicle. In one or more embodiments, the slurry is comminuted to result in substantially all of the solids having particle sizes of less than about 10 microns, i.e., between about 0.1-8 microns, in an average diameter. The comminution may be accomplished in a ball mill, continuous Eiger mill, or other similar equipment. In one or more embodiments, the suspension or slurry has a pH of about 2 to less than about 7. The pH of the slurry may be adjusted if necessary by the addition of an adequate amount of an inorganic or an organic acid to the slurry. Care should be taken that no species are added to the slurry that might coordinate to and mobilize copper. The solids content of the slurry may be, e.g., about 20-60 wt. %, and more particularly about 35-45 wt. %. The substrate may then be dipped into the slurry, or the slurry otherwise may be coated on the substrate, such that there will be deposited on the substrate a desired loading of the catalyst layer. Thereafter, the coated substrate is dried at about 100° C. and calcined by heating, e.g., at 300-650° C. for about 1 to about 3 hours. Drying and calcination are typically done in air. The coating, drying, and calcination processes may be repeated if necessary to achieve the final desired loading of the catalyst on the support. In some cases, the complete removal of the liquid and other volatile components may not occur until the catalyst is placed into use and subjected to the high temperatures encountered during operation.

After calcining, the catalyst loading can be determined through calculation of the difference in coated and uncoated weights of the substrate. As will be apparent to those of skill in the art, the catalyst loading can be modified by altering the solids content of the coating slurry and slurry viscosity. Alternatively, repeated immersions of the substrate in the coating slurry can be conducted, followed by removal of the excess slurry as described above. In a specific embodiment, the loading of the washcoat layer upon the substrate is between about 0.2 to about 3.0 $g/in^3$, or typically about 1.0 to 2.5 $g/in^3$.

Method for Treating Emissions

According to one or more embodiments of the invention, methods for treating emissions produced in the exhaust gas stream of a lean-burn or diesel vehicle are provided. The $NO_x$ abatement catalyst of one or more embodiments comprises a selective catalytic reduction (SCR) catalyst, or other catalyst for the destruction of $NO_x$ that results in a possible emission or slippage of ammonia from the $NO_x$ abatement catalyst.

The $NO_x$ abatement catalyst and oxidation catalyst composition can be disposed as a washcoat layer on the same or separate substrates. Furthermore, the SCR catalyst and the selective ammonia oxidation catalyst may be in the same catalyst housing or may be in different catalyst housings.

The engine treatment system according to one or more embodiments includes a metering system for metering ammonia, or an ammonia precursor, or a mixture of different ammonia precursors continuously or at periodic intervals into the exhaust stream.

Figure 1:
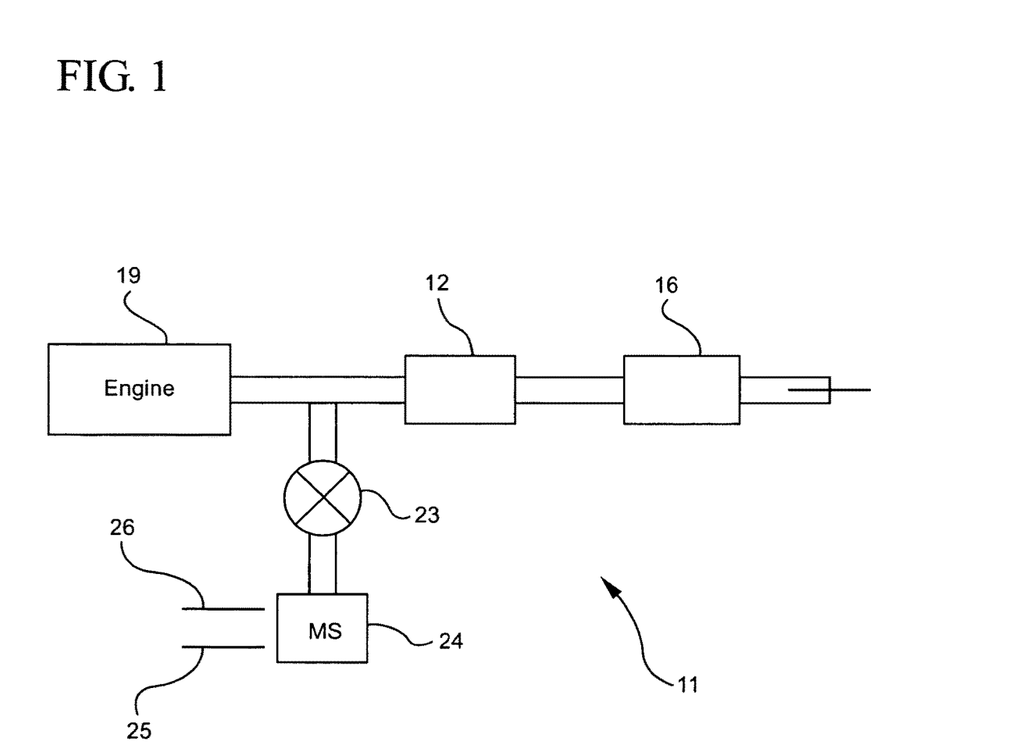
FIG. 1 shows a schematic depiction of an embodiment of an emission treatment system.

One embodiment of an inventive emission treatment system is schematically depicted in FIG. 1. As can be seen in FIG. 1, the exhaust containing gaseous pollutants (including unburned hydrocarbons, carbon monoxide and $NO_x$) and particulate matter is conveyed through emissions treatment system denoted as 11. The exhaust, containing gaseous pollutants (including unburned hydrocarbons, carbon monoxide and $NO_x$) and particulate matter, is conveyed from the engine 19 to a position downstream in the exhaust system where a reductant, i.e., ammonia or an ammonia-precursor, is added to the exhaust stream. The reductant is injected as a spray via a nozzle (not shown) into the exhaust stream. Aqueous urea shown on one line 25 can serve as the ammonia precursor which can be mixed with air on another line 26 in a mixing station 24. Valve 23 can be used to meter precise amounts of aqueous urea which are converted in the exhaust stream to ammonia.

The exhaust stream with the added ammonia is conveyed to the SCR catalyst substrate 12. On passing through the substrate 12, the $NO_x$ component of the exhaust stream is converted through the selective catalytic reduction of $NO_x$ with $NH_3$ to $N_2$ and $H_2O$. In addition, excess $NH_3$ that emerges from the inlet zone can be converted through oxidation by a downstream ammonia oxidation catalyst 16 to convert the ammonia to $N_2$ and $H_2O$ Without intending to limit the invention in any manner, embodiments of the present invention will be more fully described by the following examples.

EXAMPLES 1A-1T

Catalyst Preparation

The general preparation of a Pt+Cu on zeolite catalyst was accomplished by a sequential ion-exchange of $Cu^{2+}$ followed by a cationic platinum complex. In one example, a copper-exchanged Y-zeolite was prepared by first dissolving 75 g (375 mmol) copper acetate hydrate in 1250 mL deionized water, ensuring that all of the copper acetate had dissolved. To the resulting blue solution, 500 g (volatile free solids basis) of Zeolyst CBV500 Y-type zeolite was added slowly, giving a solid content of about 30% by weight in the suspension. The pH was adjusted to 4.5 (±0.1) and the suspension was agitated for 24 hrs at room temperature. The pH was readjusted to 4.5 (±0.1), and the sample allowed to stir for one hour more. The solids were collected by filtration, re-suspended, stirred for 10 minutes, and then recollected by filtration. The resulting filter cake was washed three times with deionized water. The wet powder was dried at 130° C. overnight, and then calcined at 640° C. for one hour. Compositional analysis of the calcined solid gave a copper content of 3.0% (volatile free, copper metal basis).

A solution containing 0.37 g (1.9 mmol) Pt, as [Pt $(NH_3)_4$][OH]$_2$), was prepared in 100 mL deionized water. Use of the hydroxide precursor has the advantage that the only coproduct of the platinum exchange process is water. To 375 mL deionized water was added 195 g of the calcined copper-exchanged zeolite. The platinum-containing solution was added dropwise to the zeolite suspension over the course of at least one hour. Two drops of concentrated nitric acid were added to decrease the pH to 5.0. The solid was collected by filtration, resuspended in 500 mL deionized water, and stirred for 10 minutes. After recollecting the solid, the powder was dried at 130° C. overnight. Compositional analysis gave 3.0% Cu and 0.23% Pt (volatile free, metal basis). The platinum-exchange process resulted in no measureable loss of copper from the original copper-exchanged zeolite sample. Furthermore, the platinum content of the final zeolite was exactly that expected if all of the platinum added was associated with the zeolite. Compositional analysis of the mother liquor from the platinum-exchange process showed no evidence for soluble platinum, indicating very good control of platinum speciation.

To prepare a catalyst for reactor testing, the catalyst powder was suspended in deionized water and milled to give a target particle size typically in the range of x90=5-10 μm. To improve adhesion of the catalyst powder to the substrate, a colloidal zirconia binder was typically added to the slurry. The colloidal zirconia has the additional effect of decreasing the viscosity and enabling coating of catalysts at higher solids content. Control of the copper speciation in the slurry is desired to prevent resolubilization of copper, as labile copper results in poor activity. Minimization of soluble $Cu^{2+}$ was accomplished by keeping the pH above 4, and by making sure that no species such as acetate are present that can complex $Cu^{2+}$. A ceramic monolith of dimensions 1.0 inch OD and 3.0 inch long, 400/6.5 cell geometry, was then dipped into the slurry for several seconds, removed, and drained. Excess slurry was removed using a stream of compressed air. The wet catalyst sample was first dried at 130° C., and then fired in air at about 600° C.

Unless otherwise noted, all catalysts were tested as fully-realized monoliths having a cell dimension of 400 cpsi and a wall thickness of 6.5 mil. Prior to testing, the monolith was shaved to a square cross-section having approximately 144 intact channels. Catalyst samples were placed in a four-chamber model gas reactor. The standard inlet gas conditions were as follows: $NH_3$=500 ppm, NO=0, $O_2$=10% (delivered as air), $H_2O$=5%, balance=$N_2$. The total gas flow was adjusted for each sample to give a gas hourly space velocity (GHSV) of 100,000/hr. Standard temperature conditions were 200, 215, 230, 245, and 400° C. Catalysts were tested in a fresh state and after an aging procedure at 750° C. for 5 hr in a feed stream containing 10% water in air. The aging procedure was designed to mimic the hydrothermal thermal stress after a substantial fraction of the catalyst lifetime on the vehicle.

Catalysts designed according the one or more embodiments of the invention have demonstrated high $NH_3$ conversions and high $N_2$ selectivity in the fresh state. Hydrothermal stability in such catalysts has been more elusive, particularly where the SCR component onto which Pt is distributed contains copper. Previous experience has shown that addition of exogenous copper to a platinum-impregnated iron-beta zeolite gives a catalyst with very high $N_2$ selectivity and a $T_{50}$ for $NH_3$ lightoff between 250° C. and 300° C. in the fresh state. After hydrothermal aging as low as 650° C., the $T_{50}$ moves to greater than 350° C., and after aging at a more realistic temperature of 750° C., $T_{50}$ is greater than 400° C. A compositionally simpler catalyst 1Q, comprising copper-exchanged beta zeolite post-treated with platinum by ion-exchange, gave fresh $NH_3$ conversion of 95% at 250° C., but the conversion after aging was zero, 1R. The loss in activity after aging is due to the presence of copper since the comparative catalysts 1N, 1O, and 1P without copper clearly demonstrate that Pt on hydrogen-form beta zeolite is highly active and stable to 800° C. This suggests that copper can interact with platinum to form a local aggregate that is less active for $NH_3$ oxidation than platinum alone. Therefore, one of the important factors in the design of platinum catalysts supported on copper-containing materials is to minimize these negative interactions, primarily by insuring that platinum and copper active sites remain physically separated.

Table 1 shows $NH_3$ activity data for 0.2 wt % Pt (metal basis) supported on beta zeolite, prepared either by direct incipient wetness impregnation of an anionic Pt(IV) precursor (comparative examples 1L and 1M) or by solution ion-exchange at pH 4-5 using $[Pt(NH_3)_4][OH]_2$ (comparative examples 1N, 1O, and 1P). In the fresh state, the $NH_3$ conversion at 250° C. for the impregnated catalyst 1L is only 64% whereas it is 93% for the ion-exchanged catalyst 1N. After a hydrothermal aging procedure at 750° C. designed to mimic a substantial fraction of vehicle lifetime, the impregnated catalyst 1M converts only 7% of the $NH_3$ at 250° C., while the ion-exchanged catalyst 1O still converts 95% of the $NH_3$ (1O). The ion-exchanged catalyst still converts more than 90% of the $NH_3$ after hydrothermal aging at 800° C. (1P).

Figure 2A:
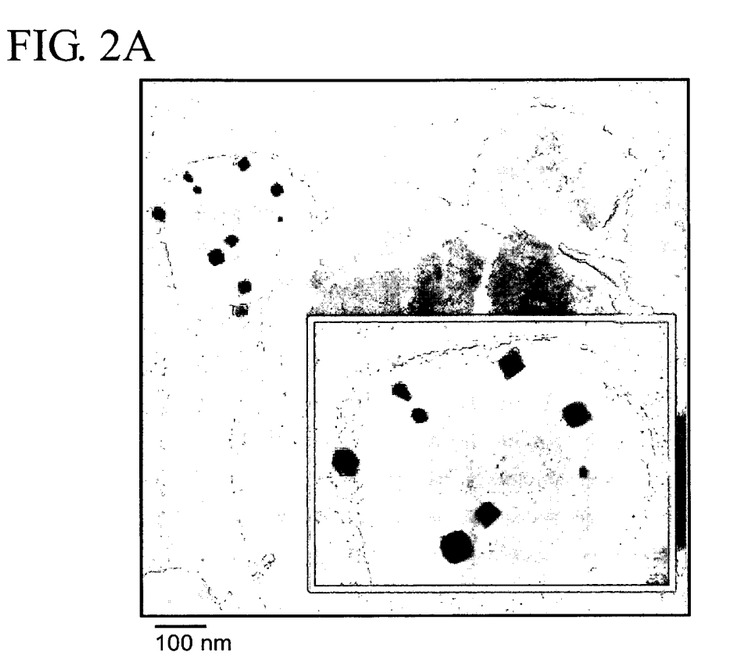
FIG. 2A shows a transmission electron micrograph image at 20,000× magnification of a Pt+beta zeolite catalyst prepared by ion-exchange of $[Pt(NH_3)_4]^{2+}$, and the inset shows detail of Pt particles.
Figure 2B:
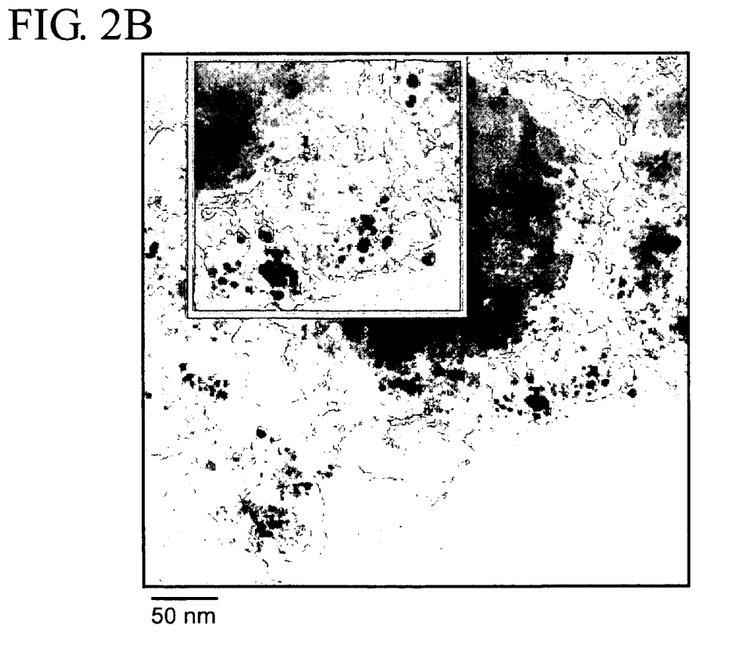
FIG. 2B shows a transmission electron micrograph image at 50,000× magnification of a Pt+beta zeolite catalyst prepared by incipient wetness impregnation of a Pt(IV) complex, and the inset shows detail of Pt particles.

The higher activity and higher stability of the ion-exchanged catalyst is associated with Pt morphology different from the impregnated catalyst. FIG. 2A shows a 200 keV transmission electron micrograph (TEM) image, 20,000× magnification, of the $[Pt(NH_3)_4]^{2+}$ ion-exchanged catalyst after preparative calcination at 450° C. This sample is equivalent to comparative example 1N in Table 1. The inset in FIG. 2A shows detail of Pt particles. The Pt exists as large, well-faceted particles with dimensions between 10 nm and 50 nm. In FIG. 2B, the image is 200 keV transmission electron micrograph, 50,000× magnification, of 0.2 wt % Pt (metal basis) on beta zeolite prepared by incipient wetness impregnation of $[Pt(OH)_6]^{2-}$, then calcined at 450° C. This sample is equivalent to comparative example 1L. The inset in FIG. 2B shows detail of Pt particles. By contrast with the ion exchanged catalyst, the Pt particles in the impregnated catalyst shown in FIG. 2B are much smaller and less regularly faceted, with average dimensions in the range from 5-10 nm. The observation of higher activity and catalytic stability in the sample having larger Pt particle size is counter to the generally accepted understanding that catalyst activity is favored by high Pt dispersion, and that Pt sintering and particle growth during operation and aging are a primary mechanism for catalyst deactivation. Without limiting the present invention by any particular theory, it is suggested that the $NH_3$ oxidation reaction on supported Pt catalysts is highly structure sensitive, and preferentially occurs on a particular Pt crystal face rather than an edge or step. By preferentially forming the active Pt crystal face in high yield, the $[Pt(NH_3)_4]^{2+}$ ion-exchange method leads to $NH_3$ oxidation catalysts that are more active and more stable than compositionally-equivalent catalysts prepared by an impregnation method. Thus the design of one or more of the embodiments incorporates the new understanding that: (1) large, well-faceted Pt particles are the desired morphology to give highly-active $NH_3$ oxidation catalysts; (2) large, well-faceted Pt particles on molecular sieve supports are more effectively generated by ion-exchange of a Pt precursor relative to the standard impregnation method.

Figure 3:
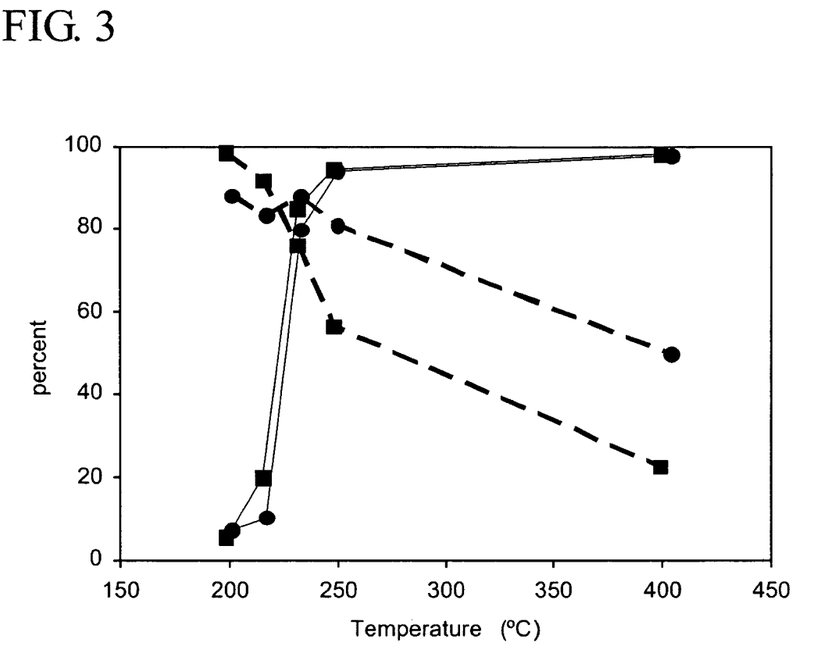
FIG. 3 shows a plot of $NH_3$ percent conversion (solid lines) and $N_2$ percent selectivity (dashed lines) as a function of temperature for comparative example 1D (circles) and example 1G (squares)

FIG. 3 compares the $NH_3$ oxidation profile for two catalysts. The comparative example 1D comprises Pt distributed on a low-silica Y zeolite, and shows an activity and selectivity profile consistent with typical Pt-only $NH_3$ oxidation catalysts. The $NH_3$ lightoff temperature is below 250° C., and the $N_2$ selectivity decreases monotonically with increasing temperature. Catalyst 1G comprises Pt distributed on a low-silica Y zeolite onto which had copper had been previously disposed by ion-exchange, as described above. Thus 1G has an equivalent Pt loading to comparative example 1D, but in addition contains 2.5% Cu. The catalyst of example 1G gives an identical $NH_3$ conversion profile as for Comparative Example 1D, but the $N_2$ selectivity is substantially increased relative to the Pt-only catalyst due to the presence of the copper. This is a consequence of the ability of the copper ions in 1A to catalyze Eq 2, so that production of $N_2$ is kinetically competitive with $N_2O$ production or $NO_x$ desorption. These data thus confirm the validity of the general paradigm for the design of selective $NH_3$ oxidation catalysts using an SCR catalyst as a support.

TABLE 1

Activity of Pt supported on zeolites and metal-exchanged zeolites as a function of composition, structure, and preparative method.

| Ex. | Zeolite structure type[a] | Pt SAR[b] | Pt method | Pt ppm[c] | Cu %[d] | washct loading g/in³ | Aging Temp/time/ $H_2O$[e] | $NH_3$ conv. %, 250° C. | $N_2$ sele. % 250° C. | $NH_3$ conv. %, 400° C. | $N_2$ sel. %, 400° C. |
|---|---|---|---|---|---|---|---|---|---|---|---|
| 1A | FAU | 5.2 | EX[f] | 1925 | 2.02 | 1.493 | fresh | 98 | 73 | 98 | 69 |
| 1B | FAU | 5.2 | EX | 1925 | 2.02 | 1.493 | 750/25/10 | 98 | 71 | 98 | 48 |
| 1C | FAU | 5.2 | EX | 1925 | 2.02 | 1.479 | 750/25/0 | 94 | 74 | 98 | 62 |
| 1D | FAU | 5.2 | EX | 2239 | 0 | 1.441 | 750/5/10 | 94 | 57 | 98 | 23 |
| 1E | FAU | 5.2 | EX | 2107 | 1.12 | 1.525 | 750/5/10 | 95 | 62 | 99 | 40 |
| 1F | FAU | 5.2 | EX | 1916 | 2.12 | 1.424 | 750/5/10 | 93 | 78 | 97 | 53 |
| 1G | FAU | 5.2 | EX | 2003 | 3.19 | 1.483 | 750/5/10 | 94 | 81 | 98 | 50 |
| 1H | FAU | 5.2 | EX | 2107 | 1.12 | 1.525 | fresh | 95 | 60 | 98 | 53 |
| 1I | FAU | 5.2 | EX | 2328 | 1.19 | 1.398 | fresh | 0 | — | 19 | 95 |
| 1J | FAU | 30 | EX | 1799 | 0.54 | 1.61 | fresh | 58 | 80 | 98 | 46 |
| 1K | FAU | 30 | EX | 1799 | 0.54 | 1.61 | 750/5/10 | 7 | 91 | 97 | 58 |
| 1L | BEA | 30 | IM[g] | 2000 | — | 1.487 | fresh | 64 | 66 | 98 | 42 |
| 1M | BEA | 30 | IM | 2000 | — | 1.449 | 750/25/10 | 7 | 74 | 96 | 48 |

TABLE 1-continued

Activity of Pt supported on zeolites and metal-exchanged zeolites as a function of composition, structure, and preparative method.

| Ex. | Zeolite structure type[a] | SAR[b] | Pt method | Pt ppm[c] | Cu %[d] | washct loading g/in³ | Aging Temp/ time/ H₂O[e] | NH₃ conv. %, 250° C. | N₂ sele. % 250° C. | NH₃ conv. %, 400° C. | N₂ sel. %, 400° C. |
|---|---|---|---|---|---|---|---|---|---|---|---|
| 1N | BEA | 30 | EX | 2340 | — | 1.695 | fresh | 93 | 56 | 99 | 47 |
| 1O | BEA | 30 | EX | 2340 | — | 1.695 | 750/25/10 | 95 | 54 | 99 | 33 |
| 1P | BEA | 30 | EX | 2340 | — | 1.695 | 800/25/10 | 90 | 55 | 98 | 34 |
| 1Q | BEA | 30 | EX | 2030 | 1.42 | 1.653 | fresh | 95 | 95 | 99 | 80 |
| 1R | BEA | 30 | EX | 2030 | 1.42 | 1.771 | 750/25/10 | 0 | — | 42 | 92 |
| 1S | CHA | 30 | EX | 2271 | 2.01 | 1.466 | fresh | 20 | 97 | 98 | 89 |
| 1T | CHA | 30 | EX | 2271 | 2.01 | 1.449 | 700/25/10 | 3 | 97 | 87 | 97 |

[a] As per International Zeolite Association designation
[b] Silica-to-alumina ratio, defined as $SiO_2/Al_2O_3$
[c] gram Pt/gram washcoat
[d] gram Cu/gram washcoat
[e] ° C./hour/percent (in air)
[f] ion exchange using $Pt(NH_3)_4^{2+}$
[g] incipient wetness impregnation.

Catalysts 1A, 1B, and 1C in Table 1 were prepared as described above. The evaluation data on these samples illustrates the high thermal and hydrothermal stability of the Pt+Cu catalysts on low-silica Y-zeolite. The $NH_3$ conversion and $N_2$ selectivity at 250° C. is not affected by aging at 750° C. for 25 hr in the presence or absence of water vapor. There is a small loss in $N_2$ selectivity at 400° C. after hydrothermal aging in 10% water vapor with the selectivity decreasing from 69% in the as prepared sample 1a to 48% in the hydrothermally aged sample 1b. This probably relates to the physical stability of the Y zeolite under hydrothermal conditions, which is negatively impacted by decreasing SAR. There are thus competing requirements for catalytic stability: (1) maximize the number of ion exchange sites by decreasing SAR. (2) minimize hydrothermal dealumination by increasing SAR. The optimal catalyst must balance these two considerations for each give application.

Figure 4:
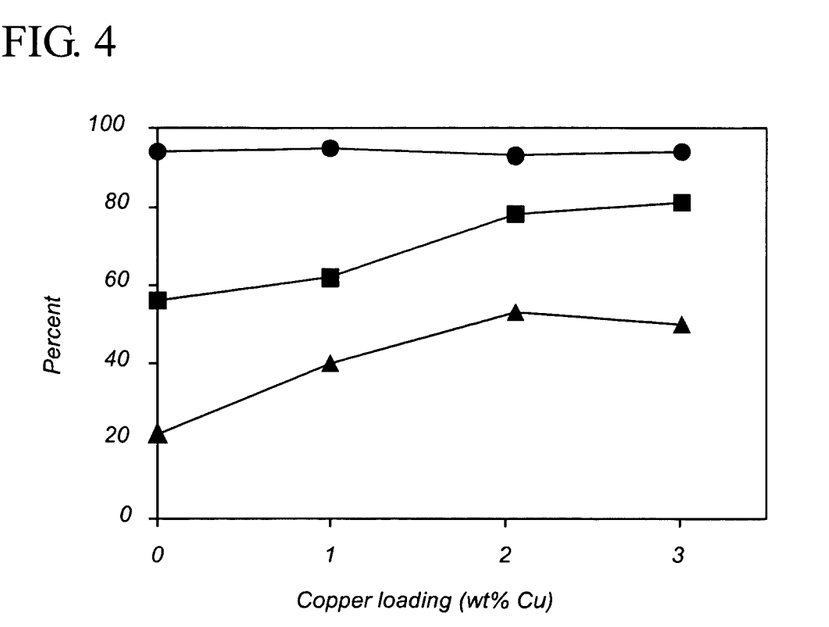
FIG. 4 shows plot of $NH_3$ percent conversion at 250° C. (circles), and $N_2$ percent selectivity at 250° C. (squares) and 400° C. (triangles) as a function of temperature for the comparative example 1D (0 Cu), and the examples 1E (1.12 wt % Cu), 1F (2.12 wt % Cu), 1G (3.19 wt % Cu)

Catalysts 1D, 1E, 1F, and 1G are Pt+Cu have a common Pt loading between 1916 and 2150 ppm and a range of copper loadings from 0 to 3.0 wt % Cu. FIG. 4 shows $NH_3$ conversion and $N_2$ selectivity results plotted against the copper content. All four catalysts give greater than 93% $NH_3$ selectivity at 250° C. The $N_2$ selectivity at 250° C. and at 400° C. generally increases with copper content, but there is a plateau in $N_2$ selectivity near 3.0 wt % Cu. Temperature-programmed reduction by hydrogen indicates that above about 3.5% copper, more than one copper species begin exists in the copper-exchanged Y zeolite, which leads to mobile copper ions that can interact with the Pt, decreasing the activity. Thus it is observed that $NH_3$ conversion suffers at high copper loadings. Therefore, there will be an optimum window of copper loading between 2.5 wt % and 3.5 wt % Cu that will give maximum selectivity while minimizing negative interactions with Pt.

Copper speciation is an important factor in determining catalyst activity. Example 1E was prepared as described above. Example 1I is compositionally similar, but without calcining the Y zeolite powder at 640° C. after ion-exchange with copper acetate. The evaluation data show that the calcination step is important to obtaining an active catalyst. The $NH_3$ conversion at 250° C. is 95% for the catalyst 1E that was calcined prior to application of the platinum precursor. On the other hand, $NH_3$ conversion is zero at 250° C. for example 1I, which was prepared without calcination prior to application of the platinum precursor. Temperature-programmed reduction by hydrogen showed that this is associated with differences in the copper speciation. In copper-exchanged samples of low-silica Y-zeolite that have not been calcined, the $H_2$ reduction profile shows no obvious $H_2$ uptake peaks, but only a broad and non-descript $H_2$ uptake profile indicative of copper in highly variable local environments. This mobile copper negatively interacts with the platinum during subsequent platinum exchange and coating steps, and the activity of the platinum for $NH_3$ oxidation consequently is decreased. By contrast, the same samples of copper on low-silica Y-zeolite after calcination at 640° C. show a clean $H_2$ uptake peak near 300° C., with $H_2$/Cu stoichiometry of 0.5, indicative of clean one-electron reduction of copper in a well-defined ion-exchange site. This copper is well fixed and is not mobile, as shown by the observation of no copper in the mother liquor after platinum exchange. This prevents interaction of the copper with the platinum component, and results in high $NH_3$ oxidation activity.

Figure 5:
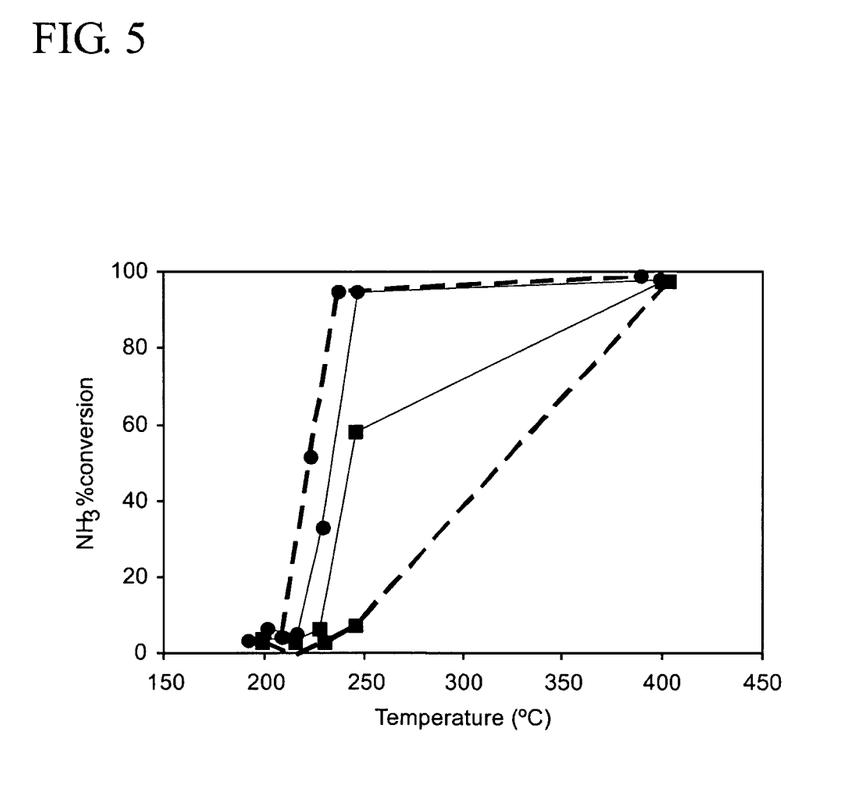
FIG. 5 shows a plot of $NH_3$ percent conversion as a function of temperature for examples 1E and 1H (circles), and 1J and 1K (squares) in the fresh state (solid lines) and aged state (dashed).

Examples 1H and 1J, comprising Pt+Cu+Y zeolite, were prepared as described above. They have equivalent copper and platinum loadings, but the two catalysts differ in the SAR. Example 1H has a low SAR of 5.2, while example 1J has an SAR of 30. Both catalysts give high activity and good $N_2$ selectivity in the fresh state, as shown by the solid lines in FIG. 5. Hydrothermal aging of the high-silica catalyst of example 1J to provide example 1K resulted in a large decrease in activity at 250° C., with $NH_3$ conversion only 7%. By contrast, the hydrothermal aging of the low-silica catalyst example 1H to give example 1G yields still gives 95% conversion at 250° C. These data on two compositionally and structurally identical Pt+Cu+Y-zeolite catalysts show that a lower SAR is a factor in increasing catalyst stability for ammonia oxidation. This teaches away from the prevailing understanding based on other reactions catalyzed by zeolite catalysts, for which stability is favored by a high SAR.

Comparison of activity and $N_2$ selectivity data for examples 1J, 1Q, and 1S show the effect of changing the zeolite structure from FAU to BEA to CHA, respectively, in Pt+Cu+zeolite $NH_3$ oxidation catalysts. Example 1Q, based on the high-silica BEA zeolite, gives 95% $NH_3$ conversion at 250° C., and the high-silica FAU of example 1J gives 58% $NH_3$ conversion. Example 1S based on the CHA zeolite, gave only 20% $NH_3$ conversion in the fresh state. The lower activity for the CHA-based catalyst in the fresh state is correlated with a small pore opening radius in the CHA framework (3.8 Å), which is not much larger than the calculated radius of gyration for the $[Pt(NH_3)_4]^{2+}$ precursor (2.6 Å). Without limiting the invention to a particular hypothesis, it is suggested that the Pt precursor cannot enter the pore structure of the CHA zeolite, and so is restricted to electrostatic binding on the outer surface of the CHA crystallites. By contrast, the pore opening radii of BEA (6.6-7.7 Å) and the FAU (7.4 Å) are large enough to permit entry of the Pt precursor into the internal pore volume of the zeolite, and it is postulated that this aids in obtaining high activity in the finished catalyst. Thus the zeolite structure appears to play only a minor role in influencing the catalyst activity, through its effect on the speciation of the initial Pt precursor. After hydrothermal aging to give corresponding examples 1K (FAU), 1R (BEA), and 1T (CHA), none of the samples gives $NH_3$ conversion greater than 7% at 250° C. The aging results reinforce the role that SAR plays relative to structural factors, and highlights the need to minimize SAR to maintain catalyst stability.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyst for oxidizing ammonia to nitrogen and $NO_x$, the catalyst comprising:
    an aluminosilicate molecular sieve having a silica-to-alumina ratio (SAR) less than about 10, the molecular sieve comprising ion-exchanged copper and ion-exchanged platinum, wherein the catalyst is effective to oxidize ammonia to nitrogen and $NO_x$ at 250° C. and above, and wherein the catalyst catalyzes substantially complete conversion of ammonia at about 250° C.

2. The catalyst of claim 1, further comprising an amount of zero valent or metallic platinum.

3. The catalyst of claim 2, wherein the ion-exchanged platinum is added via a cation-exchanged process using a platinum precursor.

4. The catalyst of claim 2, wherein the aluminosilicate molecular sieve comprises a zeolite having a crystal framework type selected from FAU, MFI, MOR, BEA, HEU, and OFF.

5. The catalyst of claim 4, wherein the zeolite has a SAR less than about 6.

6. The catalyst of claim 1, having up to about 1 weight % Pt and up to 5 weight % copper on a weight per washcoat basis.

7. The catalyst of claim 3, wherein the catalyst is capable of providing greater than about 60% selectivity for oxidizing the ammonia to dinitrogen at about 250° C.

8. The catalyst of claim 3, wherein the catalyst is capable of providing greater than about 60% selectivity for oxidizing the ammonia to dinitrogen at about 400° C.

9. The catalyst of claim 1, wherein the catalyst is coated on a refractory ceramic support.

10. The catalyst of claim 9, wherein the total loading of the molecular sieve on the refractory ceramic support is in the range of about 0.3 $g/in^3$ and about 3.0 $g/in^3$, based on total catalyst volume.

11. The catalyst of claim 1, wherein the Pt loading comprises at least about 2000 ppm.

12. The catalyst of claim 11, wherein the aluminosilicate molecular sieve comprises a zeolite having a FAU crystal framework type.

13. The catalyst of claim 1, wherein the platinum is present as well-faceted particles with dimensions between 10 and 50 nm.

14. The catalyst of claim 1, wherein the copper is dispersed on the zeolite as discrete $Cu^{2+}$ sites.

15. The catalyst of claim 1, wherein the catalyst is obtained by a process comprising
    (a) ion-exchange of copper on the aluminosilicate molecular sieve,
    (b) calcination of the aluminosilicate molecular sieve obtained in (a), and
    (c) ion-exchange of platinum on the aluminosilicate molecular sieve obtained in (b).

16. A method for treating emissions produced in the exhaust gas stream of a diesel or lean-burn vehicle, the method comprising:
    passing a vehicle's engine exhaust stream through at least a $NO_x$ abatement catalyst; and passing the exhaust stream exiting the $NO_x$ abatement catalyst and containing ammonia through the oxidation catalyst of claim 1.

17. The method of claim 16, wherein the NOx abatement catalyst is selected from one or more of an SCR catalyst, a lean $NO_x$ trap catalyst, or other catalyst for the destruction of $NO_x$ that results in slippage of ammonia from the $NO_x$ abatement catalyst.

18. The method of claim 16, wherein the $NO_x$ abatement catalyst and oxidation catalyst composition are disposed on separate substrates.

19. The method of claim 16, wherein the $NO_x$ abatement catalyst and the oxidation catalyst are disposed on the same substrate.

20. The method of claim 17, wherein the molecular sieve comprises a zeolite.

21. The method of claim 16, wherein the SAR is less than about 6.

22. A system for treating an exhaust gas stream comprising:
    an SCR catalyst in communication with the exhaust gas stream;
    an ammonia or ammonia precursor injection port in communication with the exhaust gas stream and located upstream from the SCR catalyst; and
    the catalyst of claim 1 in communication with the exhaust gas stream and located downstream from the SCR catalyst.

* * * * *